(12) United States Patent
Barnes et al.

(10) Patent No.: US 10,587,782 B1
(45) Date of Patent: Mar. 10, 2020

(54) INTELLIGENTLY CREATING AN IMMERSIVE ENVIRONMENT FOR MEDIA PLAYBACK BY SYNCHRONIZING DEVICES

(71) Applicant: INTERNATIONAL BUSINESS MACHINES CORPORATION, Armonk, NY (US)

(72) Inventors: Brandon Barnes, Raleigh, NC (US); Heidi Lagares-Greenblatt, Jefferson Hills, PA (US); Jenny S. Li, Cary, NC (US); Seth A. Malone, Centralia, MO (US); Xinlin Wang, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/398,720

(22) Filed: Apr. 30, 2019

(51) Int. Cl.
*H04N 5/04* (2006.01)
*H04N 21/41* (2011.01)
*G11B 27/34* (2006.01)

(52) U.S. Cl.
CPC ............... *H04N 5/04* (2013.01); *G11B 27/34* (2013.01); *H04N 21/4131* (2013.01)

(58) Field of Classification Search
CPC ....... H04N 5/04; H04N 21/4131; G11B 27/34
See application file for complete search history.

(56) References Cited

U.S. PATENT DOCUMENTS

| 2004/0196485 | A1* | 10/2004 | Hikichi | G06F 21/608 358/1.13 |
| 2007/0177466 | A1* | 8/2007 | Ando | G11B 27/105 369/13.01 |
| 2008/0301182 | A1* | 12/2008 | Liu | G08B 13/19669 |
| 2009/0315670 | A1* | 12/2009 | Naressi | G06F 21/10 340/5.8 |

(Continued)

OTHER PUBLICATIONS

Barco "Barco Lobby Experience transforms Regal L.A. Live into immersive cinema environment to heighten the moviegoing experience," Barco.com. URL: https://www.barco.com/en/News/Press-releases/Barco-Lobby-Experience-transforms-Regal-LA-LIVE-into-immersive-cinema-environment-to-heighten-the-mo.aspx. Apr. 11, 2016. 2 pages.

(Continued)

Primary Examiner — Thai Q Tran
Assistant Examiner — Sunghyoun Park
(74) Attorney, Agent, or Firm — Cantor Colburn LLP; William Kinnaman (57) ABSTRACT

Embodiments include creating an immersive environment for media playback by synchronizing devices. Aspects include receiving a playback tag set associated with a media item, each tag includes a respective condition, a respective attribute and a respective value of the attribute. Aspects also include determining that the first condition of the first tag is met and instructing one or more devices to apply the first value of the first tag to the first attribute of the first tag. Aspects further include determining that a first device has left a viewing area and tracking a location of the first device.

(Continued)

Aspects also include identifying a second device in proximity to the first device and receiving an outside tag set associated with the media item. Aspects further include instructing the second device to apply the first outside value of the first outside tag to the first outside attribute of the first outside tag.

20 Claims, 4 Drawing Sheets

(56) References Cited

U.S. PATENT DOCUMENTS

| | | |
|---|---|---|
| 2011/0246937 A1* | 10/2011 | Roberts ................ G11B 27/034 715/810 |
| 2015/0256564 A1 | 9/2015 | Reynolds |
| 2017/0064414 A1 | 3/2017 | Mickelsen |
| 2017/0090437 A1 | 3/2017 | Veeramani |

OTHER PUBLICATIONS

Digital Trends PlayStation 4 Pro news roundup: Everything we know so far about the next PS4; URL: https://www.digitaltrends.com/gaming/playstation-neo-news-and-rumors/ ; 21 pgs.

Goldman, Michael "Cinematically Immersive Environments," SMPTE Newswatch; URL—https://www.smpte.org/publications/past-issues/november-2015-2. Nov. 2015. 5 pages.

* cited by examiner

INTELLIGENTLY CREATING AN IMMERSIVE ENVIRONMENT FOR MEDIA PLAYBACK BY SYNCHRONIZING DEVICES

BACKGROUND

The present invention relates to media playback and, more specifically, to intelligently creating an immersive environment for media playback by synchronizing devices.

Commercial movie theaters seek to provide a cohesive experience to consumers. To this end, they invest in comfortable seating, large screens, surround sound, and other features. Similarly, when creating a home theater, consumers may purchase a large television or projector screen, speakers, blackout curtains, and comfortable seating. Each of these elements, as well as others, allow a viewer to experience a movie with some level of immersion.

SUMMARY

Embodiments include methods, systems and computer program products for intelligently creating an immersive environment for media playback by synchronizing devices. The method includes receiving a playback tag set having one or more tags associated with a media item; wherein each tag in the playback tag set includes a respective condition, a respective attribute and a respective value of the attribute. The first tag of the playback tag set includes a first condition, a first attribute, and a first value. The first attribute describes a sensory feature generatable by hardware. The method also includes determining, during play of the media item, that the first condition of the first tag is met and instructing one or more devices to apply the first value of the first tag to the first attribute of the first tag, responsive to the first condition being met. The method further includes determining that a first device has left a viewing area and tracking a location of the first device outside the viewing area. The method also includes identifying a second device in proximity to the first device, responsive to the first device leaving the viewing area and receiving an outside tag set having one or more outside tags associated with the media item. Each outside tag includes a respective condition, a respective attribute, and a respective value of the attribute. The first outside tag of the outside tag set includes a first outside condition, a first outside attribute, and a first outside value. The method further includes instructing the second device to apply the first outside value of the first outside tag to the first outside attribute of the first outside tag, responsive to the first device being in proximity to the second device.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof, describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, although movie-makers and commercial movie theaters aim to provide an immersive experience for viewers, the practicalities or real life, often interrupt that experience. When watching movies, viewers may have to leave their seats to refresh their snacks or for other reasons, or a viewer's phone might ring or flash brightly, interrupting the experience for that viewer as well as nearby viewers. The result is a break in the immersive experience of movie-watching.

Turning now to an overview of the aspects of the invention, one or more embodiments of the invention address the above-described shortcomings of the prior art by improving the immersion involved in media consumption. According to some embodiments of the invention, a set of devices in or around a viewing area, including both devices owned by viewers and devices installed in the environment, are synchronized to media during play or playback of the media item. Such devices may include not only mobile phones, but also other mobile devices, personal assistants, lighting, or other home automation components. The media item may be associated with a set of tags, each of which includes a condition (e.g., the reaching of a specific timestamp in the media item) and one or more attribute-value pairs. When the condition is met for a tag, the various devices are instructed to apply each value to the respective attribute of each attribute-value pair. For example, if the attribute is a lighting color and the value is a specific color, then application of that value may cause one or more devices to emit light in that specific color. When tags associated with media item fit the mood or events of the media item, then this synchronization with devices can extend the mood of the media item. To further extend the immersion, in some embodiments of the invention, tags can be applied to devices before or after media item playback, or to devices outside the viewing area.

The above-described aspects of the invention address the shortcomings of the prior art by incorporating a wide range of devices into media item playback to fully immerse a viewer in media item watching. As a result, the environment itself can continue the mood of media item before, during, or after media item playback.

Figure 1:
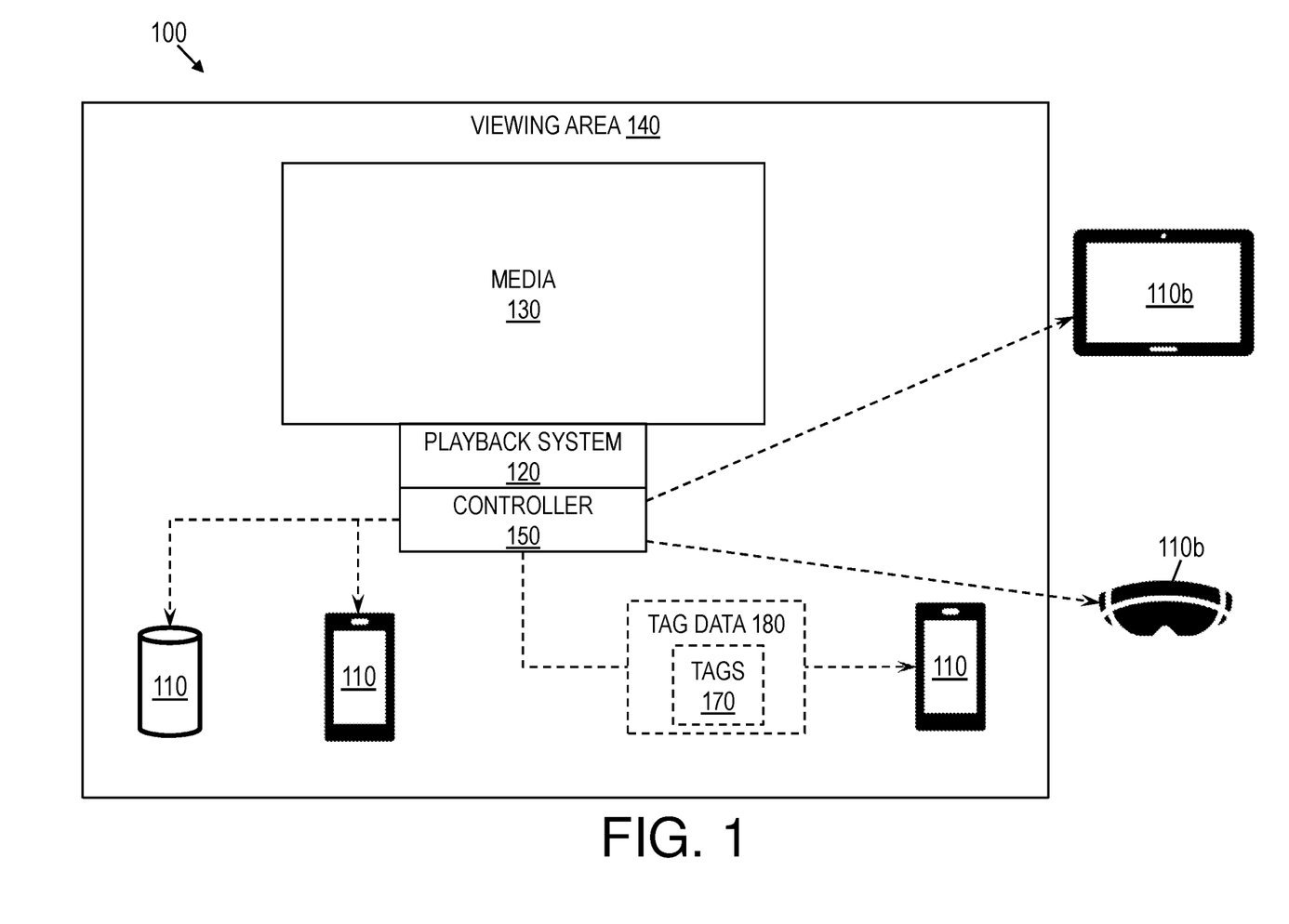
FIG. 1 is a block diagram of an immersion system according to some embodiments of the invention.

Turning now to a more detailed description of aspects of the present invention, FIG. 1 is a block diagram of an immersion system for creating an immersive environment for media item playing by synchronizing devices, according to some embodiments of the invention. As shown in FIG. 1, when media item play occurs, one or more devices 110 may be present in the vicinity of a playback system 120, where the playback system 120 is one or more devices playing the media item 130 in a viewing area 140. For instance, the playback system 120 may be a television or a combination of a projector and projector screen. Other devices 110 participating in the immersion system 100 may be installed inside or outside the viewing area 140, either temporarily or long-term, such as an automated personal assistant, home automation devices, smart lighting, speakers, or other devices 110. Further, other devices 110 may be personal devices 110 of those inside or outside the viewing area 140, such as smartphones, tablets, or notebook computers. Each of such devices 110 may participate in the immersion system 100 as described below.

For example, and not by way of limitation, the following devices 110 may be used by the immersion system 100 and, therefore, may participate in the immersion system 100: smartphones, tablets, notebook computers, desktop computers, speakers, heating systems, air conditioning systems, fans, home appliances such as vacuums and blenders, home security, doorbells, phone systems, lighting systems, seat buzzers, wind machines, aroma machines, strobe lights, fog machines, bubble machines, audio mixers, sound effect machines, balancers, subwoofers, cryo machines, and others.

The immersion system 100 may include at least one controller 150, which tracks the progress of the playback of media item 130 and communicates instructions to one or more devices 110 participating in the immersion system 100. More specifically, the controller 150 may push tag data 180, including information embedded in tags 170, to participating device 110, as described further below. For example, a controller 150 may be embedded in the playback system 120, such that the controller 150 is aware of the playback progress of the media item. Additionally or alternatively, however, the controller 150 may be in communication with the playback system 120, such that the playback system 120 communicates to the controller 150 the current state of playback of the media item 130. For another example, a controller 150 may be located remotely, such as at a remote server. In this case, the immersion system 100 may be, at least in part, a cloud-based service, with the remote server directing sychronization of some or all devices 110.

An instance of media item 130 (e.g., a movie, television show, video, video game, or piece of music) may be associated with one or more tag sets, where each tag set is a set of one or more tags 170. For example, and not by way of limitation, media item 130 may be associated with a tag set associated with pre-playback, a tag set associated with playback, a tag set associated with post-playback, and a tag set associated with a paused state of the media item 130, as described in more detail below. A tag set may include a set of tags 170, where each tag 170 includes a condition and one or more attribute-value pairs. Generally, for a tag set in use, the controller 150 may continuously determine whether a condition is met for an included tag 170 and, if so, may push to the devices 110 tag data 180 representing the tag 170 and indicating the corresponding attribute-value pair. For example, and not by way of limitation, a condition of a tag 170 may be the reaching of a timestamp in the associated media item 130 during media item play. Thus, upon the timestamp being reached, the attribute-value pairs may be implemented, or applied, across one or more participating devices 110.

Generally, an attribute may describe a sensory feature that can be generated by hardware (e.g., an accelerometer, a light, a speaker) of a device 110. For example, and not by way of limitation, an attribute in an attribute-value pair of a tag 170 may include one or more of the following: vibration pattern, vibration strength, lighting color, lighting intensity, or sound effect. One of skill in the art will understand that, given the wide range of devices 110 capable of use with embodiments of the invention, the range of possible attributes is also wide as the attributes may be applied by the various devices 110. Within an attribute-value pair, the corresponding value may be numerical or some other data type. Generally, the value assigned to an attribute in a tag 170 associated with a specific condition may indicate a state of that attribute when the condition is met (e.g., when the timestamp is reached) by an instance of playback, or play, of the associated media item 130. For example, and not by way of limitation, an environment tag may include as its condition a timestamp with a value X and may include an attribute for lighting color, where that attribute has a value of "red." In that case, when the controller 150 determines that media item play has reached time X in the media item, the controller 150 may instruct each participating device 110 to emit the color red. It will be understood, of course, that not all devices 110 need be capable of emitting light or emitting colored light, and thus, not every participating device 110 need receive or obey this instruction.

In some embodiments of the invention, each tag 170 is an instance of a data structure or class that includes a condition variable as well as a set (e.g., an array or linked list) of attributes and associated values. Further, a full tag set of tags 170 may be maintained as a linked list, with each tag 170 being a node in the linked list. Each tag set associated with a piece of media item 130 may be packaged with that media item 130 or may be downloadable in association with the media item 130, for instance. However, it will be understood that numerous other implementations are possible.

During play, when the media item meets a condition of a tag 170 (e.g., when the timestamp associated with the tag 170 is reached), the values of attributes in the tag 170 are applied, according to some embodiments of the invention. For instance, for each attribute, the controller 150 instructs the devices 110 participating to apply, to the attribute, the value associated with the attribute. For instance, in the case of an attribute controlling light color and having a value of red, upon reaching the applicable timestamp, the controller 150 may push to the device 110 tag data 180 instructing the devices 110 to apply red lighting. In some embodiments of the invention, this instruction may go out to each participating device 110, or to each device 110 registered with the immersion system 100 as having applicable hardware to implement the attribute. Upon reaching the timestamp in question, the controller 150 may send out such an instruction for each attribute in the tag 170. Further, the controller 150 may send such an instruction for each tag 170, upon meeting of the respective condition corresponding to the tag 170.

Although this disclosure refers frequently to the playback of media item 130, it will be understood to one skilled in the art that embodiments of the invention are not limited to the playback of media item 130 that has been prerecorded. For instance, a tag set may be associated with live media item 130, thereby enabling immersion associated with live media item 130 rather than the playback or prerecorded media item 130. In this case, the tag set may be generated on the fly or may be selected from existing tag sets due, for instance, to that tag set providing an appropriate mood for the playing of media item 130, whether live or prerecorded.

In order to participate in the immersion system 100 during playback of media item, a device 110 may be required to be registered with the immersion system 100. Generally, registration may require that the immersion system 100 is aware of the device 110 and that the immersion system 100 receives permission from the device. In some cases, permission can be given on a case-by-case basis, for each instance of playback of each media item 130, but in other cases, permission may be more general, applicable to various playback instances of various media item whenever the device 110 is detected as being in the viewing area 140 or otherwise notifies the immersion system 100 of the device's presence.

A device 110 may be registered for use with the immersion system 100, such that the device 110 can participate and thus receive instructions from a controller 150 as described herein, in various ways and under various circumstances. The scenario under which a device 110 is registered may be dependent on how the immersion system 100 is implemented and on which party is running the immersion system 100.

Embodiments of the invention may be implemented by various parties involved in media item playback. For example, and not by way of limitation, movie-making companies may determine a tag set to accompany a piece of media item, specifically a film, and a commercial movie theater may manage the immersion system 100, including one or more controllers 150. In that case, the participating devices 110 may include personal devices 110 of customers as well as installed lighting, screens, and other devices 110 around the movie theater. In a home theater, devices 110 such as a personal assistants, automated home lighting, automated curtains or blinds, or even a smart thermostat can participate. For instance, the curtains or blinds may close and the lights may dim when the current scene of the media item is dark; and if a scene of the media item is set in winter or if a character is swimming in cold water, then the thermostat may cause the temperature in the room to drop. In the case of a home theater, the immersion system 100 may be run by a streaming service or by a smart TV, such as with the streaming service incorporating a remote controller 150 or with the smart TV incorporating a local controller 150. A home router or personal assistant can be used to push tag data 180 to various devices 110 participating in immersion related to media item playback. Further, when the media item is paused, some or all devices 110 participating may then become outside devices 110b, which will be described below, and which may continue the mood of the media item 130 even while playback is paused. It will be understood that embodiments of the invention can be implemented in various ways, not limited to the specific examples given herein.

Especially in the case of a home theater, a user may register his or her device 110 through a streaming service or smart TV implementing the immersion system 100. For instance, when the user indicates that he or she would like to watch a piece of media item 130, the immersion system 100 may prompt the user to register one or more devices 110 detected as being nearby, or the user may select networked devices 110 to register with the immersion system 100. At a commercial movie theater, one or more kiosks may be available and may be connected to the immersion system 100, such that a user can register his or her device 110 through the kiosk. In that case, for instance, the kiosk may detect nearby devices 110, and the user may confirm the identity of his or her device 110 and may provide permission for the immersion system 100 to utilize the device 110 as a participating device 110.

During registration, a device 110 or user of the device 110 may connect to the immersion system 100, such as by way of pairing with the controller 150. For instance, the immersion system 100 may scan for nearby devices 110 and may identify a device 110 to be registered. After a connection is made or while connecting, the immersion system 100 may ask the device 110, or a user of the device 110, to confirm permission to synchronize such that the device 110 can participate in media item playback. In some embodiments of the invention, the immersion system 100 may also obtain permission to track a location of the device 110. In some embodiments of the invention, the device 110 may specify to the immersion system 100, such as by way of a user enter selections into the device 110 for transmission to the immersion system 100, which attributes of tags 170 are allowed to be applied to the device 110. As such, a controller 150 pushing tag data 180 to the device 110 may restrict such tag data 180 to certain attributes allowed by the device 110, or the device 110 may opt to implement only such tag data. As a result, synchronization of a device 110 may be tailored, or personalized, to a user's preferences.

If permission to synchronize is given, then the immersion system 100 (e.g., the controller 150) may store an identifier of the device 110, where the identifier may be used to communicate with the device 110 or to recognize the device 110 for future playback. The permission may be general or applicable to only a selected playback instance. For a general permission, the device 110 may be associated with an immersion condition, which may be set by a user of the device 110 or may be set by the immersion system 100. The immersion condition may be a condition, which may be a compound condition made up of a combination of sub-conditions, under which the device 110 is allowed to be used for immersion applicable to an instance of playing back media item 130. In the future, when the device 110 is detected by a controller 150 of the immersion system 100, the immersion system 100 may recognize the device 110 and synchronize the device 110 to media item playback if the immersion condition for the device 110 is met.

A tag set may be generated through various mechanisms, such as by a creator of the media item 130 or by a third party opting to enhance the experience of playing the media item 130. Typically, however, the tags 170 in the tag set may be developed to align with the mood of the media item 130. For instance, at a moment in the media item 130 designed to be shocking or scary, a tag 170 corresponding to the timestamp (i.e., whose condition is met by reaching that timestamp) of that moment may call for a sharp vibration. As a result, each viewer with a participating personal device 110 may feel or hear that device 110 vibrate, adding to the atmosphere. For another example, if a character in the media item enters a red-lit room at a moment in the media item, a tag 170 corresponding to the timestamp of that moment may call for red lighting. As a result, the controller 150 may instruct smart lighting (e.g., a part of home automation) and notification lighting of smart devices 110 in the room to emit red light. It will be understood that a wide range of tags 170 are possible to enhance viewers' immersion in the media item 130. Thus, embodiments of the invention enable devices 110 at least in the vicinity of the playback system 120 to maintain a mood of the media item 130 based on the set of tags 170 associated with the media item 130.

In some embodiments of the invention, the immersive experience of the immersion system 100 can be extended outside the viewing area 140 of the media item playback. Generally, the viewing area 140 is a room or other area in which a viewer has a line of sight to the playback system 120 so as to watch the media item 130 as the media item 130 is played. In some embodiments of the invention, a device 110 installed outside the viewing area 140 (e.g., outside the room in which the media item 130 is being displayed, outside the theater room) may be enabled to continue the immersive experience through the synchronization described herein. For instance, if a viewer leaves the theater room to go to concessions, it is desirable for that viewer to stay immersed in the movie.

When a participating device 110 leaves the viewing area 140, it can be assumed that a viewer left the viewing area 140 with the participating device 110. The immersion system 100 may track the location of the device 110, thereby tracking the location of the viewer associated with the device 110. The immersion system 100 may thus extend the experience of media item playback to the current location of the viewer when the viewer is not in the viewing area 140. To this end, the immersion system 100 may utilize outside devices 110b, including the device 110 of the user being tracked. An outside device 110b is a device 110 participating in the synchronization system 100 from outside the viewing area 140. For example, and not by way of limitation, outside devices 110b may include lighting, such as lighting in the hallways or bathrooms of movie theaters; an outside device 110b may be an augmented reality headset that the viewer can borrow when leaving the viewing area 140; an outside device 110b may be a digital movie poster or concessions screen in a movie theater hallway or lobby; or an outside device 110b may be a smartphone or tablet carried by a viewer who left the viewing area 140. An outside device 110b may be connected to the controller 150 either wired or wirelessly, or both. A wired connection may be more practical for some outside devices 110b that are physically installed, as might be the case for lighting, for instance, while a wireless connection may be more practical for mobile devices 110.

In some embodiments of the invention, outside devices 110b apply the same tags 170 as those in the viewing area 140. Additionally or alternatively, however, an outside device 110b may receive instructions to implement an outside tag set that differs (i.e., different conditions or different attribute-value pairs) from the tag set implemented by devices 110 inside the viewing area 140. In this case, the tag sets associated with the media item 130 during playback may include a first tag set applicable to devices 110 inside the viewing area 140 and a second tag set applicable to one or more devices 110 outside the viewing area 140. Further, as described above, certain tags 170 may be applicable to only a subset of devices 110, and this may be the case for outside devices 110b as well. For instance, in some cases, a tag 170 may relate specifically to augmented reality outside the viewing area 140, allowing a viewer to carry aspects of the media item (e.g., ambient lighting, appearance of fog or other weather conditions, appearance of a setting in the media item 130, vibrations reflecting a theme or current scene) outside the viewing area 140 by way of an augmented reality headset or other augmented reality device 110.

As described above, the immersion system 100 may include one or more controllers 150. In some embodiments of the invention, a controller 150 at a remote server may be used to push tag data 180 to outside devices 110b. For example, and not by way of limitation, a local controller 150 that is local to the playback system 120 and the viewing area 140 may communicate tag data 180 to devices 110 in the viewing area 140 or to outside devices 110b within a range of the local controller 150, while a remote controller 150 at a remote server may communicate applicable tag data 180 to outside devices 110b or to devices unreachable by the local controller 150. To this end, the local controller 150 and the remote controller 150 may communicate about which controller 150 is instructing which devices 110 participating in the media item playback.

Additionally or alternatively, in some embodiments of the invention, the immersion system 100 may begin immersing a viewer in a media item experience even before media item playback begins (i.e., pre-playback) or may continue immersion after the media item ends (i.e., post-playback), or both. For devices 110 for which post-playback immersion is activated, post-playback immersion may begin following the conclusion of playback of the media item 130. Initiation of pre-playback immersion may occur in various ways. For example, and not by way of limitation, if a device 110 is already registered with the immersion system 100, then the device 110 may be associated with an immersion condition, which may include an indication about whether, or under what circumstances, the device 110 is to begin immersion related to an upcoming media item playback. More specifically, the immersion condition may indicate whether, or when, tag data 180 may be pushed to the device prior to playback of media item 130. For instance, if the device 110 has a record of an upcoming media item playback, such as in the form of a calendar record or in the form of a user requesting that immersion begin for a particular piece of media item 130 or a particular upcoming media item playback instance, the device 110 may communicate this record to the immersion system 100 (e.g., to the remote controller 150), and the immersion system 100 may begin immersion in advance of the actual media item playback.

Prior to the beginning of playback, after completion of playback, or when playback is paused, one or more tags 170 may be applied to the device 110 even though the media item 130 is not currently in a state of play. For instance, additionally or alternatively to being associated with a tag set for media item playback, the media item 130 may be associated with a pre-playback tag set, a post-playback tag set, or a tag set for use when the media item 130 is paused. The controller 150 may instruct the devices 110 to implement the tags 170 in each tag set during the applicable timeframe (e.g., during media item playback, prior to media item playback, after media item playback, during a paused period). For another example, the immersion system 100 may have one or more established tag sets that are associated with types of media item 130. For instance, a first tag set may be associated with romantic comedies, while a second tag set may be associated with horror movies. Generally, the tags 170 in such a tag set may be associated with the type of media item 130, without having to be associated with specific media item 130. In that case, for pre-playback immersion or post-playback immersion, the immersion system 100 may determine the type of media item (e.g., by being manually notified or by reading metadata associated with the media item 130) and may select a tag set associated with that type for pre-playback or post-playback, while a tag set specifically designed for the media item 130 may be used during playback. As such, tags 170 appropriate to the media item 130 may be applied, causing a participating device 110 to extend a mood of the media item before playback or after playback, or both.

In some embodiments of the invention, immersion ends with respect to a device 110 (i.e., the immersion system 100 stops sending tag data 180 to the device 110) when an ending condition associated with the device 110 is met. In other words, for instance, a device 110 may be activated and, therefore, may become active in the immersion system 100 when the respective immersion condition is met, and the device 110 may be deactivated and, therefore, may become again inactive in the immersion system 100 when the respective ending condition is met. The ending condition may be established during registration of a device 110 or afterward and may be associated with the device 110 in the immersion system 100. The ending condition may simply require that media item playback has ended, or for example, the ending condition may indicate that immersion on the device 110 should end a half hour after playback ends or when the location of the device 110 is at a user's specified home. If the ending condition enables immersion to continue after the end of media item playback, then the immersion system 100 may begin implementing post-playback tags 170 after the media item 130 ends. In some embodiments of the invention, by default, the ending condition of a device 110 may be that the end of the media item 130 playing has been reached.

Figure 2:
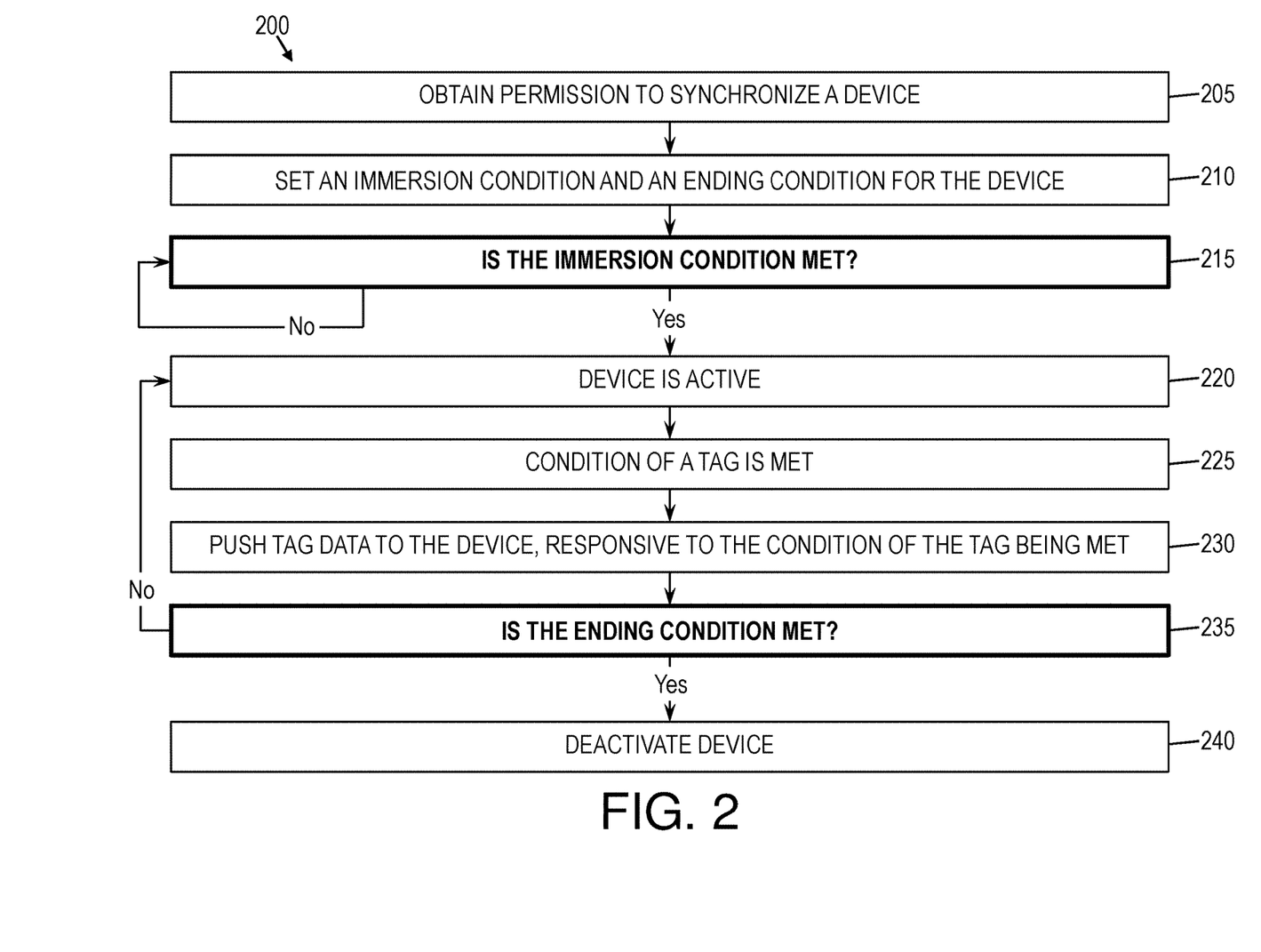
FIG. 2 is a flow diagram of a method of creating an immersive environment through synchronizing devices to media playback, according to an embodiment of the invention.

FIG. 2 is a flow diagram of a method of creating an immersive environment through synchronizing devices 110 to media item 130, according to some embodiments of the invention. As shown in FIG. 2, at block 205, the immersion system 100 obtains permission to synchronize a device 110 for immersion with respect to a specific instance of playing media item 130. At block 210, an immersion condition and an ending condition are set for the device 110. In some embodiments of the invention, if the immersion condition is not set explicitly, then synchronization of the device 110 is set to begin when the media item 130 begins, and if no ending condition is set explicitly, then the sychronization may be set to end when the media item 130 ends. The obtaining of permission and setting of conditions may be performed for each device 110 participating in the immersion system 100.

At decision block 215, when the immersion system 100 detects a connection to the device 110, the immersion system 100 (e.g., a controller 150) may determine whether the immersion condition for the device 110 is met. This determination may be made by comparing the current circumstances to the immersion condition. Again, in some embodiments of the invention, this determination may be made for each device 110 individually, even for a single media item playback instance, because a first device 110 may begin participating in immersion prior to a second device 110, as may be case when the first device 110 is participating in pre-playback immersion while the second device 110 is not. If the immersion condition is met for the device 110, then at block 220, the device 110 is active and immersion proceeds. For instance, one or more controllers 150 may be configured to send tag data 180 to the device 110 as tags 170 become active (i.e., the conditions of the tags 170 are met).

At block 225, a tag 170 becomes active, due to its condition being met. For instance, if media item playback is ongoing, a timestamp associated with the tag 170 may be reached, thereby activating the tag 170. At block 230, responsive to the condition of the tag 170 being met, the controller 150 may push the applicable tag data 180, including an instruction to implement each attribute-value pair, of the tag 170 to the device 110.

At decision block 235, it may be determined whether the ending condition for the device 110 has been met. This determination may be made for each device 110 involved in immersion related to playback of the media item 130. If the ending condition is not met, then the device 110 remains involved in the immersion, and the method 200 returns to block 220 to await further tag data 180. However, if the ending condition is met, then immersion ends for the device 110 for the current playback instance, at block 240. More specifically, for instance, the controller 150 stops sending tag data 180 to the device 110.

Figure 3:
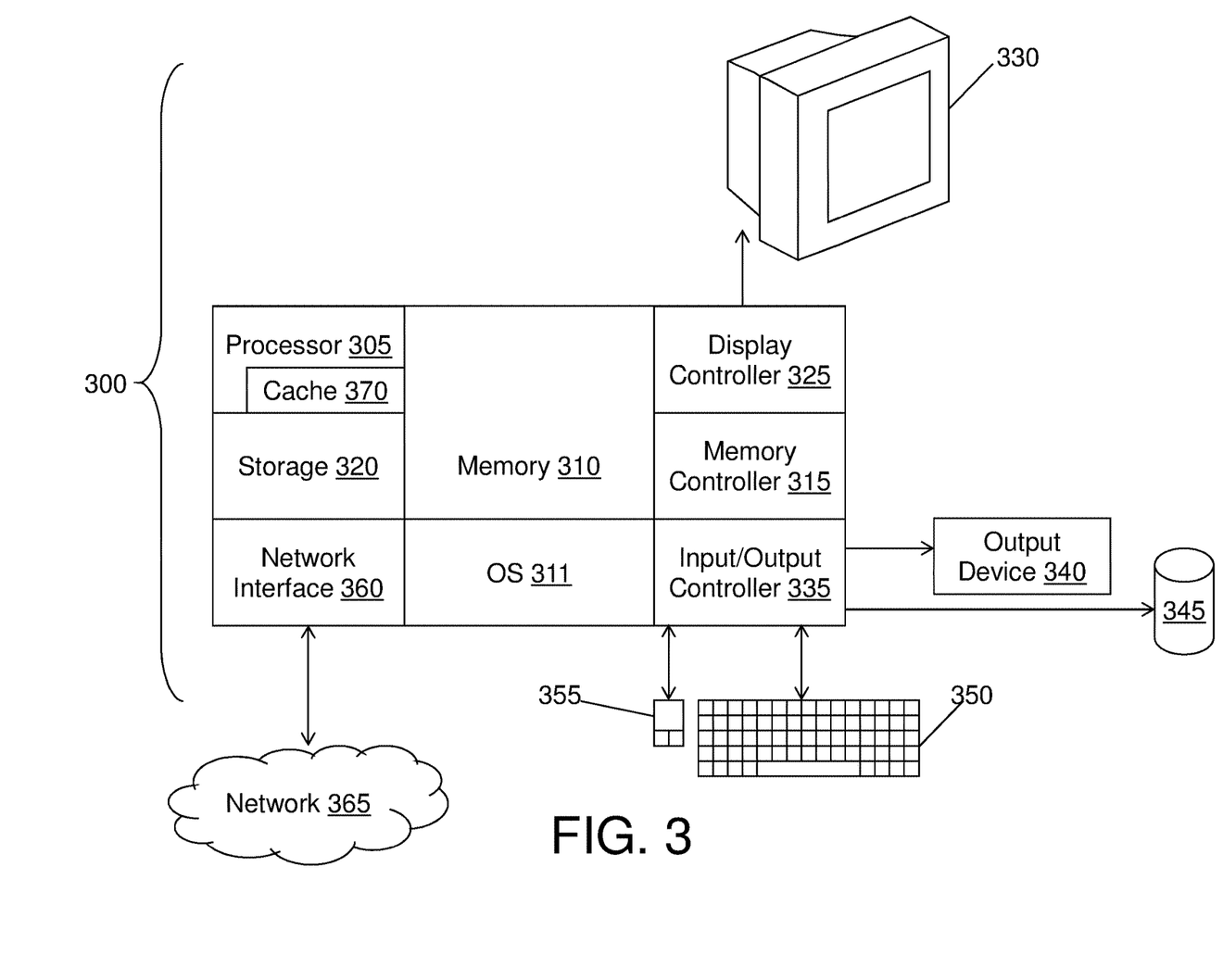
FIG. 3 is a block diagram of a computer system for implementing some or all aspects of the immersion system, according to some embodiments of this invention.

FIG. 3 is a block diagram of a computer system 300 for implementing some or all aspects of the immersion system 100, according to some embodiments of this invention. The immersion systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, each controller 150 and each device 110 may be a computer system 300 or portion thereof.

In some embodiments, as shown in FIG. 3, the computer system 300 includes a processor 305, memory 310 coupled to a memory controller 150, and one or more input devices 110 and/or output devices 110, such as peripherals, that are communicatively coupled via a local I/O controller 150. These devices 110 and 345 may include, for example, a printer, a scanner, a microphone, and the like. Input devices such as a conventional keyboard 350 and mouse 355 may be coupled to the I/O controller 150. The I/O controller 150 may be, for example, one or more buses or other wired or wireless connections, as are known in the art. The I/O controller 150 may have additional elements, which are omitted for simplicity, such as controllers, buffers (caches), drivers, repeaters, and receivers, to enable communications.

The I/O devices 110, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media item. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the immersion systems 100 and methods of this disclosure.

The computer system 300 may further include a display controller 150 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Immersion systems 100 and methods according to this disclosure may be embodied, in whole or in part, in computer program products or in computer systems 300, such as that illustrated in FIG. 3.

Figure 4:
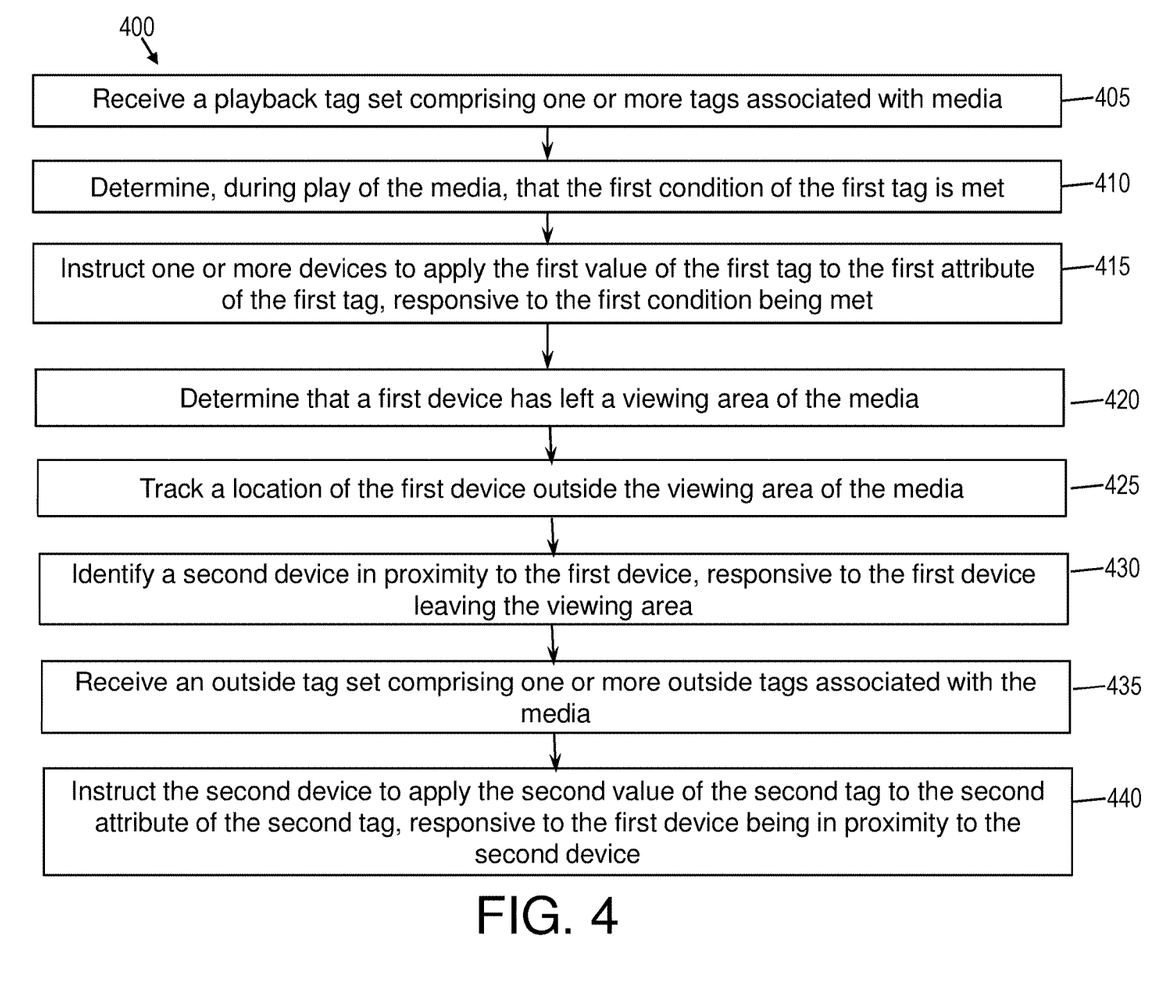
FIG. 4 is a flow diagram of a method of creating an immersive environment through synchronizing devices to media playback, according to another embodiment of the invention.

Turning now to FIG. 4, a flow diagram of a method 400 of creating an immersive environment through synchronizing devices to media item playback, according to an embodiment of the invention is shown. As shown at block 405, the method 400 includes receiving a playback tag set comprising one or more tags associated with media item. Next, as shown at block 410, the method 400 includes determining, during play of the media item, that the first condition of the first tag is met. The method 400 also includes instructing one or more devices to apply the first value of the first tag to the first attribute of the first tag, responsive to the first condition being met, as shown at block 415.

As shown at block 420, the method 400 includes determining that a first device has left a viewing area of the media item. Next, as shown at block 425, the method 400 includes tracking a location of the first device outside the viewing area of the media item. The method 400 also includes identifying a second device in proximity to the first device, responsive to the first device leaving the viewing area, as shown at block 430. Next, the method 400 includes receiving an outside tag set comprising one or more outside tags associated with the media item, as shown at block 435. The method 400 concludes by instructing the second device to apply the first outside value of the first outside tag to the first outside attribute of the first outside tag, responsive to the first device being in proximity to the second device, as shown at block 440.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a playback tag set comprising one or more tags associated with a media item, wherein each tag in the playback tag set comprises a respective condition, a respective attribute and a respective value of the attribute;
   wherein a first tag of the playback tag set comprises a first condition, a first attribute, and a first value, and wherein the first attribute describes a sensory feature generatable by hardware;
   determining, during play of the media item, that the first condition of the first tag is met;
   instructing one or more devices to apply the first value of the first tag to the first attribute of the first tag, responsive to the first condition being met;
   determining that a first device has left a viewing area;
   tracking a location of the first device outside the viewing area;
   identifying a second device in proximity to the first device, responsive to the first device leaving the viewing area;
   receiving an outside tag set comprising one or more outside tags associated with the media item, wherein each outside tag comprises a respective condition, a respective attribute, and a respective value of the attribute;
   wherein a first outside tag of the outside tag set comprises a first outside condition, a first outside attribute, and a first outside value; and
   instructing the second device to apply the first outside value of the first outside tag to the first outside attribute of the first outside tag, responsive to the first device being in proximity to the second device.

2. The computer-implemented method of claim 1, wherein the first condition requires reaching a timestamp in the media item.

3. The computer-implemented method of claim 1, further comprising:
   activating the device prior to the play of the media item;
   receiving a pre-playback tag set comprising one or more pre-playback tags associated with the media item, wherein each pre-playback tag of the pre-playback tag set comprises a respective condition, a respective attribute, and a respective value of the attribute;
   wherein a second tag of the pre-playback tag set comprises a second condition, a second attribute, and a second value;
   determining, prior to the play of the media item, that the second condition of the second tag is met; and
   instructing the device to apply the second value of the second tag to the second attribute of the second tag, responsive to the device being active and the second condition being met.

4. The computer-implemented method of claim 1, further comprising:
   determining that the media item has concluded;
   receiving a post-playback tag set comprising one or more post-playback tags associated with the media item, wherein each post-playback tag of the post-playback tag set comprises a respective condition, a respective attribute, and a respective value of the attribute;
   wherein a second tag of the post-playback tag set comprises a second condition, a second attribute, and a second value;
   determining, after conclusion of the media item, that the second condition of the second tag is met; and
   instructing a device to apply the second value of the second tag to the second attribute of the second tag, responsive to the device remaining active after the conclusion of the media item and the second condition being met.

5. The computer-implemented method of claim 1, further comprising:
   determining that the media item is paused;
   receiving a pause tag set comprising one or more pause tags associated with the media item, wherein each pause tag of the pause tag set comprises a respective condition, a respective attribute, and a respective value of the attribute;
   wherein a second tag of the pause tag set comprises a second condition, a second attribute, and a second value;
   determining, while the media item is paused, that the second condition of the second tag is met; and
   instructing a device to apply the second value of the second tag to the second attribute of the second tag, responsive to the media item being paused and the second condition being met.

6. The computer-implemented method of claim 1, wherein the second device is installed outside the viewing area.

7. The computer-implemented method of claim 1, further comprising:
   receiving, from a first device of the one or more devices, an indication of which attributes to implement on the first device; and
   deciding to instruct the first device to apply the first value to the first attribute based at least in part on the indication.

8. A system comprising:
   a memory having computer-readable instructions; and
   one or more processors for executing the computer-readable instructions, the computer-readable instructions comprising:
      receiving a playback tag set comprising one or more tags associated with a media item, wherein each tag in the playback tag set comprises a respective condition, a respective attribute and a respective value of the attribute;
      wherein a first tag of the playback tag set comprises a first condition, a first attribute, and a first value, and wherein the first attribute describes a sensory feature generatable by hardware;
      determining, during play of the media item, that the first condition of the first tag is met;
      instructing one or more devices to apply the first value of the first tag to the first attribute of the first tag, responsive to the first condition being met;
      determining that a first device has left a viewing area;
      tracking a location of the first device outside the viewing area;
      identifying a second device in proximity to the first device, responsive to the first device leaving the viewing area;
      receiving an outside tag set comprising one or more outside tags associated with the media item, wherein each outside tag comprises a respective condition, a respective attribute, and a respective value of the attribute;

wherein a first outside tag of the outside tag set comprises a first outside condition, a first outside attribute, and a first outside value; and instructing the second device to apply the first outside value of the first outside tag to the first outside attribute of the first outside tag, responsive to the first device being in proximity to the second device.

9. The system of claim 8, wherein the first condition requires reaching a timestamp in the media item.

10. The system of claim 8, the computer-readable instructions further comprising:

activating the device prior to the play of the media item;

receiving a pre-playback tag set comprising one or more pre-playback tags associated with the media item, wherein each pre-playback tag of the pre-playback tag set comprises a respective condition, a respective attribute, and a respective value of the attribute;

wherein a second tag of the pre-playback tag set comprises a second condition, a second attribute, and a second value;

determining, prior to the play of the media item, that the second condition of the second tag is met; and instructing the device to apply the second value of the second tag to the second attribute of the second tag, responsive to the device being active and the second condition being met.

11. The system of claim 8, the computer-readable instructions further comprising:

determining that the media item has concluded;

receiving a post-playback tag set comprising one or more post-playback tags associated with the media item, wherein each post-playback tag of the post-playback tag set comprises a respective condition, a respective attribute, and a respective value of the attribute;

wherein a second tag of the post-playback tag set comprises a second condition, a second attribute, and a second value;

determining, after conclusion of the media item, that the second condition of the second tag is met; and instructing a device to apply the second value of the second tag to the second attribute of the second tag, responsive to the device remaining active after the conclusion of the media item and the second condition being met.

12. The system of claim 8, the computer-readable instructions further comprising:

determining that the media item is paused;

receiving a pause tag set comprising one or more pause tags associated with the media item, wherein each pause tag of the pause tag set comprises a respective condition, a respective attribute, and a respective value of the attribute;

wherein a second tag of the pause tag set comprises a second condition, a second attribute, and a second value;

determining, while the media item is paused, that the second condition of the second tag is met; and instructing a device to apply the second value of the second tag to the second attribute of the second tag, responsive to the media item being paused and the second condition being met.

13. The system of claim 8, wherein the second device is installed outside the viewing area.

14. The system of claim 8, the computer-readable instructions further comprising:

receiving, from a first device of the one or more devices, an indication of which attributes to implement on the first device; and deciding to instruct the first device to apply the first value to the first attribute based at least in part on the indication.

15. A computer-program product for synchronizing a device to play a media item, the computer-program product comprising a computer-readable storage medium having program instructions embodied therewith, the program instructions executable by a processor to cause the processor to perform a method comprising:

receiving a playback tag set comprising one or more tags associated with the media item, wherein each tag in the playback tag set comprises a respective condition, a respective attribute and a respective value of the attribute;

wherein a first tag of the playback tag set comprises a first condition, a first attribute, and a first value, and wherein the first attribute describes a sensory feature generatable by hardware;

determining, during play of the media item, that the first condition of the first tag is met;

instructing one or more devices to apply the first value of the first tag to the first attribute of the first tag, responsive to the first condition being met;

determining that a first device has left a viewing area;

tracking a location of the first device outside the viewing area;

identifying a second device in proximity to the first device, responsive to the first device leaving the viewing area;

receiving an outside tag set comprising one or more outside tags associated with the media item, wherein each outside tag comprises a respective condition, a respective attribute, and a respective value of the attribute;

wherein a first outside tag of the outside tag set comprises a first outside condition, a first outside attribute, and a first outside value;

instructing the second device to apply the first outside value of the first outside tag to the first outside attribute of the first outside tag, responsive to the first device being in proximity to the second device.

16. The computer-program product of claim 15, wherein the first condition requires reaching a timestamp in the media item.

17. The computer-program product of claim 15, the method further comprising:

activating the device prior to the play of the media item;

receiving a pre-playback tag set comprising one or more pre-playback tags associated with the media item, wherein each pre-playback tag of the pre-playback tag set comprises a respective condition, a respective attribute, and a respective value of the attribute;

wherein a second tag of the pre-playback tag set comprises a second condition, a second attribute, and a second value;

determining, prior to the play of the media item, that the second condition of the second tag is met; and instructing the device to apply the second value of the second tag to the second attribute of the second tag, responsive to the device being active and the second condition being met.

18. The computer-program product of claim 15, the method further comprising:
- determining that the media item has concluded;
- receiving a post-playback tag set comprising one or more post-playback tags associated with the media item, wherein each post-playback tag of the post-playback tag set comprises a respective condition, a respective attribute, and a respective value of the attribute;
- wherein a second tag of the post-playback tag set comprises a second condition, a second attribute, and a second value;
- determining, after conclusion of the media item, that the second condition of the second tag is met; and
- instructing a device to apply the second value of the second tag to the second attribute of the second tag, responsive to the device remaining active after the conclusion of the media item and the second condition being met.

19. The computer-program product of claim 15, the method further comprising:
- determining that the media item is paused;
- receiving a pause tag set comprising one or more pause tags associated with the media item, wherein each pause tag of the pause tag set comprises a respective condition, a respective attribute, and a respective value of the attribute;
- wherein a second tag of the pause tag set comprises a second condition, a second attribute, and a second value;
- determining, while the media item is paused, that the second condition of the second tag is met; and
- instructing a device to apply the second value of the second tag to the second attribute of the second tag, responsive to the media item being paused and the second condition being met.

20. The computer-program product of claim 15, wherein the second device is installed outside the viewing area.

* * * * *